US006180161B1

(12) United States Patent
Axelrod

(10) Patent No.: US 6,180,161 B1
(45) Date of Patent: *Jan. 30, 2001

(54) HEAT MODIFIABLE EDIBLE DOG CHEW

(75) Inventor: Glen S. Axelrod, Mahwah, NJ (US)

(73) Assignee: T.F.H. Publications, Inc., Neptune City, NJ (US)

( * ) Notice: Under 35 U.S.C. 154(b), the term of this patent shall be extended for 0 days.

This patent is subject to a terminal disclaimer.

(21) Appl. No.: 09/114,872

(22) Filed: Jul. 14, 1998

Related U.S. Application Data

(63) Continuation-in-part of application No. 08/993,748, filed on Dec. 19, 1997, which is a continuation-in-part of application No. 08/738,423, filed on Oct. 25, 1996.

(51) Int. Cl.[7] .................................................. A23L 1/0522
(52) U.S. Cl. .......................... 426/623; 426/630; 426/635; 426/805
(58) Field of Search ................................... 426/623, 630, 426/635, 805

(56) References Cited

U.S. PATENT DOCUMENTS

| | | |
|---|---|---|
| 3,821,446 | 6/1974 | Estey et al. ............................. 426/373 |
| 3,899,607 | 8/1975 | Miller et al. ........................... 426/285 |
| 4,032,665 * | 6/1977 | Miller et al. ........................... 426/104 |
| 4,171,383 | 10/1979 | Chwalek et al. ...................... 426/623 |
| 4,310,558 | 1/1982 | Nahm, Jr. .................................. 426/98 |
| 4,315,034 | 2/1982 | Levinson et al. ..................... 426/104 |
| 4,735,808 * | 4/1988 | Scaglione et al. ....................... 426/62 |
| 4,784,860 | 11/1988 | Christensen et al. ................... 426/26 |
| 4,800,099 | 1/1989 | Gellman et al. ...................... 426/641 |
| 4,886,440 | 12/1989 | Forrest et al. ......................... 429/208 |
| 4,892,748 | 1/1990 | Anderson et al. .................... 426/635 |
| 5,000,973 | 3/1991 | Scaglione et al. .................... 426/549 |
| 5,094,870 | 3/1992 | Scaglione et al. .................... 426/549 |
| 5,200,212 * | 4/1993 | Axelrod .................................... 426/2 |
| 5,240,720 | 8/1993 | Axelrod .................................... 426/2 |
| 5,296,209 | 3/1994 | Simone et al. ......................... 424/49 |
| 5,419,283 | 5/1995 | Leo ....................................... 119/709 |
| 5,476,069 | 12/1995 | Axelrod ............................... 119/709 |
| 5,591,491 | 1/1997 | Ando ................................... 427/544 |

FOREIGN PATENT DOCUMENTS

| | | |
|---|---|---|
| 3701861 | 8/1988 | (DE) . |
| 19501142 | 7/1995 | (DE) . |
| 337573 * | 10/1989 | (EP) . |
| 2705864 | 6/1993 | (FR) . |

* cited by examiner

*Primary Examiner*—Chhaya D. Sayala
(74) *Attorney, Agent, or Firm*—Hayes, Soloway, Hennessey, Grossman & Hage, P.C.

(57) ABSTRACT

A completely digestible highly nutritious dog chew formulated primarily of beaded corn starch or a mixture of beaded corn starch and potato starch, and calcium carbonate, the texture of hardness or which is easily modified to suit a particular dog by the dog owner. By irradiating the chew in a microwave oven, the chew is caused to expand and is thereby rendered more easily chewable.

15 Claims, 1 Drawing Sheet

HEAT MODIFIABLE EDIBLE DOG CHEW

This application is a continuation-in-part of U.S. patent application Ser. No. 08/993,748 filed Dec. 19, 1997, which is a continuation-in-part of U.S. patent application Ser. No. 08/738,423 filed Oct. 25, 1996.

BACKGROUND OF THE INVENTION

1. Field of the Invention

The present invention relates to dog chews, and more particularly, pertains to a vegetable starch-based completely digestible, nutritious dog chew, the texture or hardness of which is easily heat modified to suit a particular dog.

2. Brief Description of the Prior Art

Most dogs enjoy chewing on things although preferences vary as to the hardness of the substances favored. Some dogs like to chew on very hard materials such as cow bones, wood, nylon, others prefer softer chews such as polyurethane or rubber while still others favor freeze dried snacks. Some dogs, due to their age, may not be able to chew on the very hard substances. Young dogs have insufficiently developed teeth, while old dogs may have diseased gums or may have lost some of their teeth.

Many indigestible objects are given to dogs as a chew and although the dogs may enjoy chewing thereon, the objects are often swallowed in whole or in part. Once swallowed, these objects or fragments thereof can have an adverse effect on the dogs digestion and can become impacted in the dog's intestinal tract with life-threatening consequences. By way of example, dog chews have been marketed which utilize an ethylene copolymer which can be fractured by the chewing action of a dog, and when ingested can block the dog's stomach passages.

Other edible dog chews have been marketed which have a comparatively short shelf life and therefore must be replaced by retail outlets at frequent intervals. Yet other prior art dog chews are lacking in structural integrity whereby they are susceptible to breakage during handling and shipping.

Applicant's assignee T.F.H. Publications, Inc. has previously developed an edible dog chew that is wholly digestible, nutritious and having a texture or hardness which is individually adjustable by the application of heat to suit a wide variety of dog's preferences or needs. Such dog chews utilize a mixture containing primarily casein and are disclosed in Herbert R. Axelrod U.S. Pat. Nos. 5,200,212 and 5,240,720. Such dog chews, while constituting a major improvement over other prior art edible dog chews, do not provide all the advantages of the dog chew of the present invention.

SUMMARY OF THE INVENTION

The present invention provides an edible dog chew that is completely digestible, nutritious, devoid of deleterious additives and of a modifiable texture or hardness that is quickly and easily tailorable by the owner to suit the need or preference of his particular dog. In addition, such edible dog chews have a long shelf life as compared to prior edible dog chews. The chews are extremely rugged so as to be able to withstand shocks resulting from shipping and handling. Upon removal from the chew's package, the chew can be caused to swell up to four to eight times its original volume, if desired, by subjecting it to microwave radiation. With this procedure, the chew's texture or hardness can be adjusted to any magnitude from its original high density extremely hard state to a low density expanded easily chewed state depending upon the amount of microwave exposure to which it is subjected. Accordingly, the chew can thereby be quickly and easily to the texture preference of a wide variety of dogs from a strong large healthy dog to a small puppy with puppy teeth or an older dog with decayed molars. Additionally, the dog chew of the present invention is biodegradable which is important should a dog bury the bone.

Other features and advantages of the present invention will become apparent from the following detailed description taken into conjunction with the accompanying drawings which illustrate by way of example the principles of the invention.

DETAILED DESCRIPTION OF A PREFERRED EMBODIMENT

A preferred form of edible dog chew of the present invention has as a basic ingredient, a beaded corn starch material or a combination of a beaded corn starch material and a beaded potato starch material. The corn starch material can be obtained by a wet mill process wherein the corn is soaked until soft, the outer shell is then removed and, the remaining material is beaded. A suitable potato starch product is sold under the trademark PARAGON IM 1010 by AVEBE of Veendam, The Netherlands, which is sold in the form of thermoplastic beads or pellets which can be molded into a desired shape. A mixture of beaded corn starch, water and calcium carbonate is extruded to form pellet. The weight contents of such beads or pellets are about 70% potato starch, about 15% water (about 10% after the pellets are molded), and about 5 to 10% calcium carbonate. It has been found that a suitable mixture includes about 15% water by weight, 60–70% beaded corn starch by weight, and about 5–10% calcium carbonate by weight. It has also been found that a suitable range of corn starch to potato starch mixture is between 10% to 50% by weight. To the beaded corn starch or beaded corn starch and beaded potato starch mixture a dog attractant may be added such as chicken powder, liver powder, ham, turkey, beef, and/or fish in the amount of 1 to 5% by weight. Natural vegetable or cereal additives such as oats, spinach and carrots are also added in the amount of about 1–5% by weight. The resultant extruded pellets are molded under heat and pressure into a desired form, such as a dog bone. Molding can be accomplished in an injection molding machine at temperatures between 250° to 400° F. and pressures of 1000 to 2500 PSI depending upon the injection molding machine utilized, the materials location within the molding machine, the type of additives, the particular mold, and the size of the bone being molded. The water content of the dog bone is decreased to about 10% after molding, and may be packaged in moisture-proof packaging at such water content.

Figure 1:
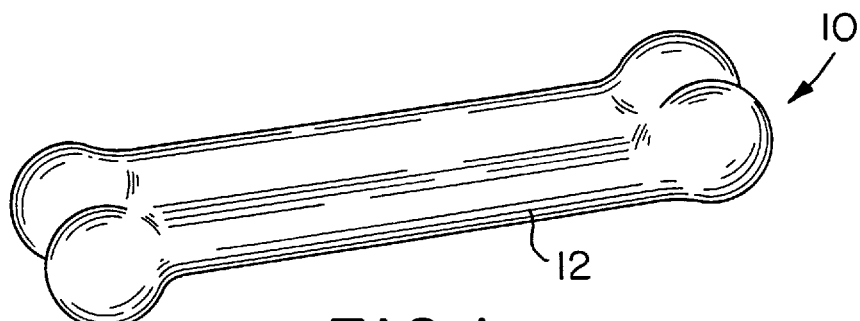
FIG. 1 illustrates a preferred embodiment of an edible dog chew embodying the present invention in its unexpanded state.
Figure 2:
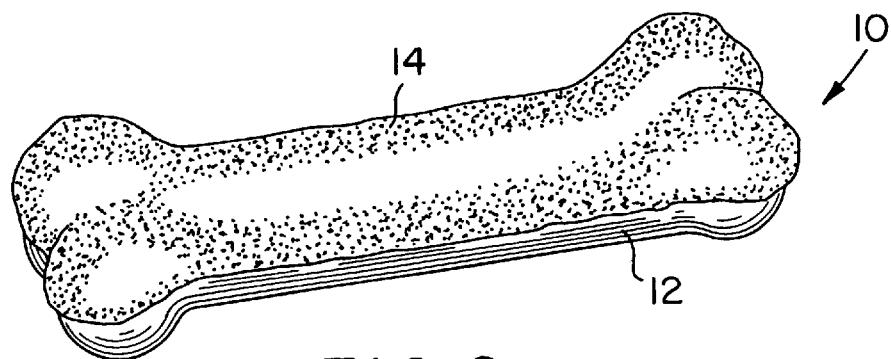
FIG. 2 illustrates the dog chew of FIG. 1 in its partially expanded state.
Figure 3:
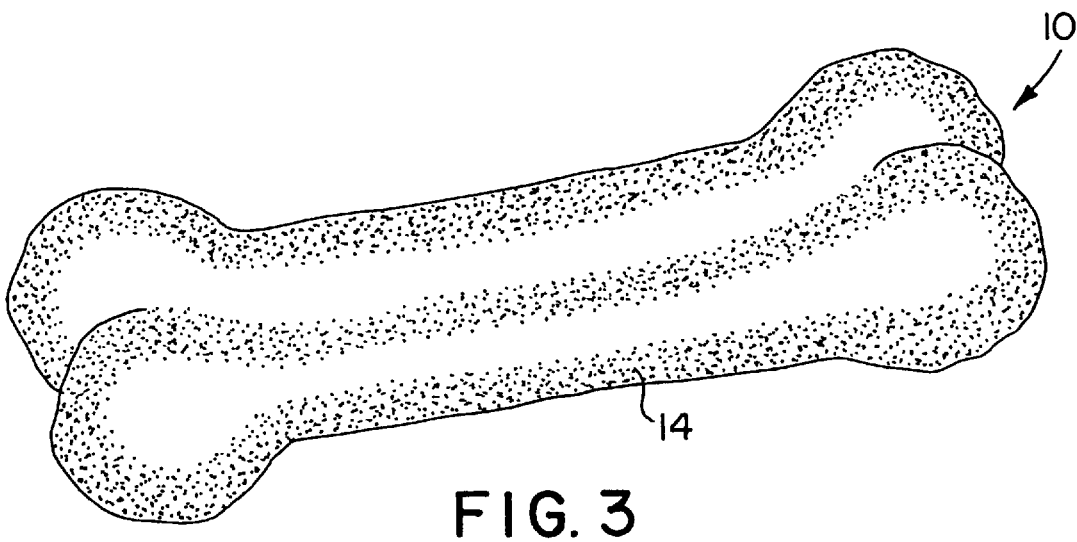
FIG. 3 illustrates the dog chew of FIG. 1 in its fully expanded state.

Upon removal from the package, the person feeding the dog can modify the texture or hardness of the molded chew by heating, preferably in a microwave oven. The expansion of the moisture within the chew causes the chew to expand. Subjecting the chew to microwave radiation facilitates the heating of areas deep within the chew at the same time the exterior heats up and expands. FIG. 1 illustrates the chew 10 prior to heating, in which state it has a substantially smooth exterior surface 12 and is of an extremely hard texture preferred by some dogs. A short exposure to microwave radiation initiates the expansion process. FIG. 2 illustrates the chew 10 in a partially expanded state evidenced by partially bubbled surface 14. In this state the chew 10 is of an intermediate hardness preferred by other dogs. FIG. 3 illustrates the chew 10 in a fully expanded state as may result from a 25 seconds to 1 minute exposure in a standard household microwave oven, depending upon the size of the bone and the power setting of the oven. The entire chew 10 has a bubbled surface 14 and is easily chewable by most dogs. The chew in this state is ideal for small dogs with puppy teeth or old dogs who suffer from gum disease or may have lost teeth. Sufficient exposure to microwave radiation will cause the chew to expand up to about 4 to 8 times its original volume with a commensurate reduction in hardness.

In use, the chew is given to the dog in its initial hardness state. If the dog is unwilling or is unable to chew on it, the chew is microwaved for short time increments and re-offered to the dog until the chew reaches a state of expansion and degree of hardness preferred by the dog. Large, strong and healthy dogs would probably prefer the chew in its unmodified and hardest state, while very small, young or very old dogs would prefer the chew in its most expanded state.

It should be particularly noted that an edible dog chew made in accordance with the present invention does not dry out and fall apart after being packaged and accordingly can have a shelf life of several years without being packaged in a waterproof container. Additionally, the dog chew is resistant to breakage during shipping and handling.

While a particular form of the invention has been illustrated and described it will be apparent to those skilled in the art that various modifications can be made without departing from the spirit and scope of the invention. Accordingly, it is not intended that the invention be limited except as by the appended claims.

What is claimed is:

1. A dog chew formed by extruding a mixture consisting essentially of beaded corn starch, about 15% water by weight, and about 5 to 10% calcium carbonate by weight to form pellets and then injection molding said pellets to form said dog chew, wherein the water level of the dog chew is reduced to about 10% after molding.

2. The dog chew of claim 1 which further includes vegetable additives.

3. The molded dog chew of claim 1, further comprising natural vegetable additives at between about 1 wt % and about 5 wt %.

4. The molded dog chew of claim 1, further comprising cereal additives.

5. A dog chew formed by extruding a mixture consisting essentially of beaded corn starch, beaded potato starch, about 15% water by weight and about 5 to 10% calcium carbonate by weight to form pellets and then injection molding said pellets to form said dog chew, wherein the water level of the injection molded dog chew is reduced to about 10% after molding.

6. The molded dog chew of claim 5, wherein said corn starch is present in an amount from about 10 wt % to about 50 wt % of the amount of said potato starch.

7. A molded dog chew formed by extruding a mixture consisting essentially of about 66–70% corn starch by weight, about 15% water by weights about 5 to 10% calcium carbonate by weight, and about 1–5% natural vegetable additives by weight, to form pellets and then injection molding said pellets to form said dog chew, wherein the water level of the injection molded dog chew is reduced to about 10% after molding.

8. The dog chew of claim 7, wherein the injection molding takes place at about 1,000 to 2,500 PSI and a temperature of about 250°–400° F.

9. A method of producing a hardness-adjustable edible dog chew, comprising the steps in sequence of:

extruding a mixture consisting essentially of beaded corn starch, about 15% water by weight and about 5–10% calcium carbonate by weight to form pellets;

injection molding such pellets into the shape of a dog chew; and decreasing the water content of said dog chew to about 10% after molding.

10. The method of claim 9 further comprising the steps of adding to the mixture about 1–5% by weight of natural vegetable additives and about 1–5% by weight of an attractant.

11. The method of claim 9, wherein the mixture is injection molded at a pressure of about 1,000 to 2,500 PSI and at a temperature of about 250–450° F.

12. A method of producing a hardness-adjustable edible dog chew, comprising the steps in sequence of:

extruding a mixture consisting essentially of a beaded corn starch, beaded potato starch, about 15% water by weight and about 5–10% calcium carbonate by weight to form pellets;

injection molding such pellets into the shape of a dog chew; and decreasing the water content of said dog chew to about 10% after molding.

13. The method of claim 12 wherein the corn starch and potato starch content is about 10–50% corn starch to potato starch.

14. The method of claim 13 further comprising the steps of adding to the mixture about 1–5% by weight natural vegetable additives and about 1–5% by weight of a dog attractant.

15. The method of claim 14 wherein the mixture is injection molded at a pressure of about 1,000 to 2,500 PSI and at a temperature of about 250–400° F.

* * * * *